May 7, 1946.  R. H. SULLIVAN  2,399,768

DYNAMO-ELECTRIC MACHINE

Filed May 15, 1944

INVENTOR
Raymond H. Sullivan
BY
Spencer Hardman Fehr
his ATTORNEYs

Patented May 7, 1946

2,399,768

UNITED STATES PATENT OFFICE 2,399,768

DYNAMOELECTRIC MACHINE

Raymond H. Sullivan, Rochester, N. Y., assignor to General Motors Corporation, Detroit, Mich., a corporation of Delaware Application May 15, 1944, Serial No. 535,573

1 Claim. (Cl. 171—228)

This invention relates to D. C. electric motors, and particularly to D. C. motors which operate at high speed. A major source of trouble is destructive sparking at the brushes due to the brushes disengaging from the commutator at high speeds, such as 10,000 to 20,000 R. P. M. Within that speed range, a motor with a 32 bar commutator will produce a brush frequency over 5,000 to over 10,000 vibrations per second. When a brush is continually vibrating on the commutator, it interrupts the inductive circuit of the motor and causes a high inductive voltage to be generated. The higher this voltage, the more destructive will be the sparking at the brushes. It is practically impossible to design a brush and brush spring combination having a natural vibration period high enough to prevent vibration. If the brush spring tension is increased beyond a certain range, the mechanical wear and the power consumed due to friction would be prohibitive.

The object of this invention is to reduce sparking at the brushes; and this object is accomplished by means of electromagnetic damping circuits located on the armature core. These circuits comprise short-circuited turns of resistance wire interlinked magnetically with the armature coils connected with the commutator. Each short circuited coil is wound into the same core slots as the armature coil or coils with which it is magnetically interlinked. Therefore each main armature coil is completely magnetically interlinked with a short circuited coil at all times. When the flow of load current is changed or interrupted by brush vibration destructive sparking is eliminated. This is done at the expense of efficiency; but for certain types of service, such as high speed operation, efficiency is of less importance than the life of brushes and the commutator. The number of short-circuited turns equals the number of core slots; and each core slot contains active sides of two different short-circuited turns.

Further objects and advantages of the present invention will be apparent from the following description, reference being had to the accompanying drawing wherein a preferred embodiment of the present invention is clearly shown.

The performance of a conventional D. C. motor will first be described with reference to Fig. 1.

Figure 3:
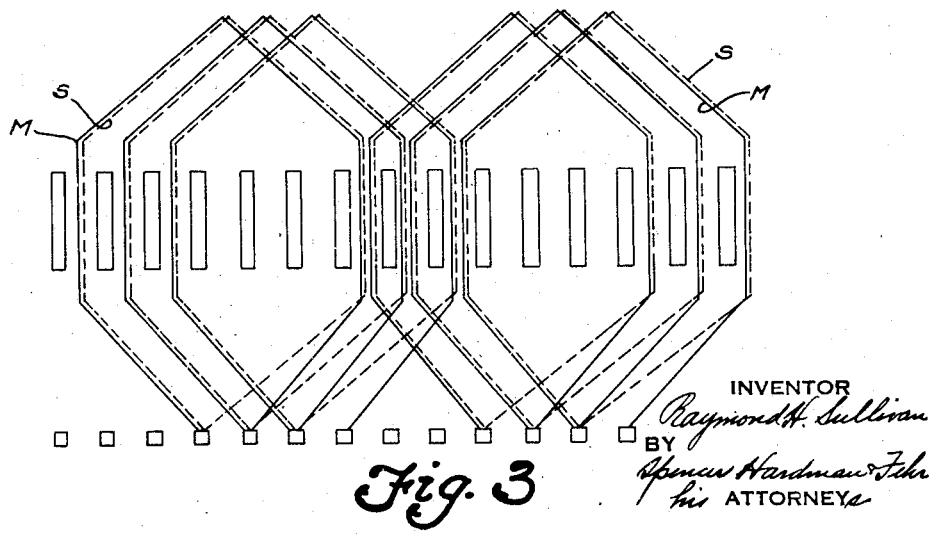
Fig. 3 is a wiring diagram of the armature having main armature coils M and short circuited coils S.

$L_1$ = inductance of the armature coils M connected with the commutator bars C in the manner indicated by Fig. 3.

$R_1$ = resistance of the armature coils M.

B = indicates separable contacts representing the circuit breaker effect due to vibrating brushes.

$R_2$ = resistance across B.

$E_L$ = line voltage, the voltage impressed by a current source.

When the brushes are on the commutator, full motor current is flowing in the windings M. When the brushes leave the commutator, due to vibration, the current tends to decrease at a rate depending on the circuit constants at the time of interruption. The values $L_1$ and $R_1$ are constants, but $R_2$ varies with the amount of sparking at the brushes. When there is no sparking, $R_2$ is high. When a spark forms, $R_2$ is low.

$i_0$ = current at the instant of interruption at B.

$i_1$ = current at any instant after the circuit is interrupted at B.

$R_0$ = the total circuit resistance after the instant of interruption.

$t$ = time in seconds after interruption.

$\frac{di_1}{dt}$ = rate of change in motor current when the circuit is interrupted at B.

$e_1$ = motor inductive voltage due to interruption at B.

$$e_1 = L_1 \frac{di_1}{dt} + E_L \qquad (1)$$

If it were possible to open the circuit at B without producing an arc, the value $$\frac{di_1}{dt}$$

would be infinitely great and would cause an infinitely high voltage at B in accordance with Equation 1. This is an impossible condition to obtain because the high inductive voltage causes the air between the vibrating brush and the commutator to break down and an arc is formed between the separated brush and commutator.

The current $i_1$ in the motor circuit at any instant after the time of interruption is $$i_1 = i_0 \epsilon^{-\frac{R_0 t}{L_1}} \qquad (2)$$

By substituting Equation 2 in Equation 1, $$e_1 = L_1 \frac{d\left(i_0 \epsilon^{-\frac{R_0 t}{L_1}}\right)}{dt} + E_L$$

$$e_1 = R_0 i_0 \epsilon^{-\frac{R_0 t}{L_1}} + E_L \qquad (3)$$

At the instant of interruption $t$ in Equation 3 is equal to zero.
This makes $$\epsilon^{-\frac{R_0 t}{L_1}}$$

in Equation 3 equal to $\epsilon^{-0} = 1$.
Therefore, when $t=0$, $$e_1 = R_0 i_0 + E_L \qquad (4)$$

Figure 1:
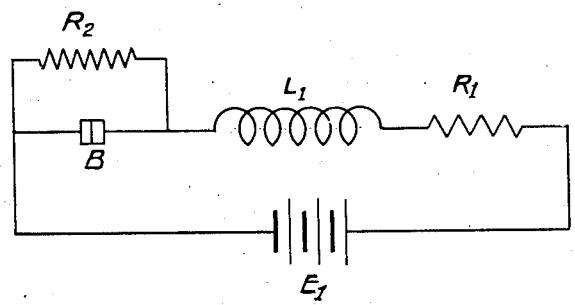
Fig. 1 is a wiring diagram of the equivalent of a conventional D. C. motor.

In the case of the conventional motor represented by Fig. 1, $$R_0 = R_1 + R_2 \qquad (5)$$

By substituting Equation 5 in Equation 4, $$e_1 = (R_1 + R_2) i_0 + E_L \qquad (6)$$

Therefore, when the brush separates from the commutator $R_2$ is very high until an arc is formed. This is the cause of the high inductive voltage shown in Equation 6.

Figure 2:
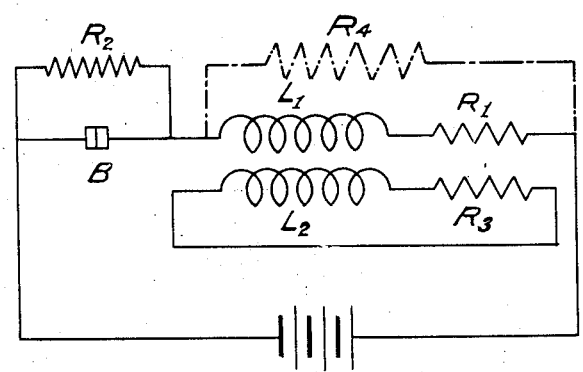
Fig. 2 is a wiring diagram of the equivalent of a D. C. motor provided with short circuited coils interlinked with the armature coils.

Sparking at the brushes can be reduced by inductively coupling the main armature coils M with short circuited coils S as represented by Fig. 3. The equivalent of this circuit is shown in Fig. 2, in which $L_2$ is the inductance of the coils S and $R_3$ is the resistance. The circuit of Fig. 2 may be simplified by putting $R_3$ in terms of the motor circuit. Omit $L_2$ and $R_3$ from Fig. 2 and add $R_4$ indicated in dot-dash lines.

$$R_4 = R_3 (A_n)^2$$

$A_n$ being the turn ratio or $$\frac{\text{number of turns of } M \text{ coils}}{\text{number of turns of } S \text{ coils}}$$

When the circuit is interrupted at B, the effect produced by the S coils is the same as if there were a circuit damping resistance $R_4$ shunted across the motor windings. The circuit of the motor windings M is damped by a resistance $R_4$ shunted across the motor inductive circuit instead of the shunting resistance formed by an electric arc at the brushes.

Equation 6 therefore becomes $$e_1 = i_0 (R_1 + R_4 A_n) + E_L \qquad (7)$$

As $R_1$ in a series motor is relatively small, it may be neglected.

$$e_1 = i_0 R_4 A_n + E_L \qquad (8)$$

In a D. C. motor made according to Fig. 3, if there are 16 armature core slots, two coils M per slot, and six turns per coil, the total number of turns of the M coils equal 192. The total number of S coils $$16 \times 1 = 16. \quad A_n = \frac{192}{16} = 12$$

If $R_4 = 10.9$ and $i_0 = 4$, $$e_1 = (4 \times 10.9 \times 12) + E_L = 523 + E_L$$

$E_L$ will add directly in the case of D. C. circuits, but will add and subtract alternately in case of A. C. circuits.

From the foregoing it is apparent that, instead of creating a destructive arc when a brush separates from the commutator, the electrical energy is absorbed by inducing a voltage in the short circuited turns. Therefore, the tendency of the armature flux to decay rapidly is resisted by an increasing flux threading the short circuited turns, which flux is caused by virtue of the voltage induced therein. This induced voltage in the short circuited turns is, in the example given, the product of multiplying the resistance of the short-circuited turns (10.9 ohms) by the armature current (4 amperes) by the transformation ratio (12). The voltage induced is 523 volts. The summation of current in the short-circuited turns at time of separation of the brush is 48 amperes. It creates a flux which opposes the decay of armature flux in order to minimize the inductive voltage of the armature. In other words, the short-circuited turns on the armature operate like the short-circuited turns of a slow-acting or time-lag relay. Anthough Fig. 3 indicates only 16 main coils M, it will be understood that, when 32 main coils are used, there will be 32 commutator bars and each core slot will contain four active coil sides of different main coils. The commutator bars connected with short-circuited turns are spaced by bars not so connected.

Connection of the short circuited turns to the commutator is for mechanical reasons only. The commutator bars or risers act merely as a convenient support for the joints of the short-circuited coils and serve to resist the action of centrifugal force.

While the embodiment of the present invention as herein disclosed, constitutes a preferred form, it is to be understood that other forms might be adopted, all coming within the scope of the claim which follows.

What is claimed is as follows:

A direct current dynamo electric machine having an armature comprising a core having teeth spaced by slots, a commutator, brushes engageable with the commutator, multi-turn coils connected with the commutator and surrounding a group of core teeth, and short-circuited damping coils interlinking all of the multi-turn coils, each damping coil spanning the group of core teeth surrounded by a multi-turn coil, said damping coils serving to reduce the inductive voltage which is caused by the interruption of the load current in the inductive circuit of the armature due to brush vibration.

RAYMOND H. SULLIVAN.